United States Patent [19]

Budecker

[11] 4,285,198

[45] Aug. 25, 1981

[54] ACCUMULATOR CHARGING VALVE

[75] Inventor: Ludwig Budecker, Frankfurt, Fed. Rep. of Germany

[73] Assignee: ITT Industries, Inc., New York, N.Y.

[21] Appl. No.: 88,693

[22] Filed: Oct. 26, 1979

[30] Foreign Application Priority Data

Nov. 17, 1978 [DE] Fed. Rep. of Germany ....... 2849877

[51] Int. Cl.$^{3}$ ............................................ G05D 15/00

[52] U.S. Cl. .................................... 60/547 A; 60/418; 60/562; 60/582; 137/117; 91/460

[58] Field of Search ................. 60/547 R, 547 A, 582, 60/548, 413, 418, 562; 91/460, 516, 532; 137/101, 117, 118

[56] References Cited

U.S. PATENT DOCUMENTS

| | | | |
|---|---|---|---|
| 3,886,848 | 6/1975 | Budecker et al. | 60/418 |
| 3,995,529 | 12/1976 | Bach et al. | 60/413 |
| 4,016,895 | 4/1977 | Budecker | 137/101 |
| 4,057,073 | 11/1977 | Adams | 137/118 |
| 4,072,011 | 2/1978 | Ewald | 60/562 |
| 4,084,604 | 4/1978 | Budecker et al. | 137/101 |
| 4,130,127 | 12/1978 | Budecker et al. | 137/101 |

FOREIGN PATENT DOCUMENTS 2364413 7/1975 Fed. Rep. of Germany .

*Primary Examiner*—William R. Cline
*Assistant Examiner*—H. Jay Spiegel
*Attorney, Agent, or Firm*—John T. O'Halloran; Alfred C. Hill

[57] ABSTRACT

The charging valve comprises a pressure port connected with a pressurized fluid source, a first user port which is connectible to a first user component, a second user port which is connectible to an accumulator and to a second user component of the closed center type and a valve device which is switchable dependent upon the pressure existing in the accumulator. The valve device, below a predetermined pressure in the accumulator, connects the pressure via a throttle with the second user port and, above a predetermined pressure in the accumulator, connects the pressure with the first user port. The valve device includes a closing valve which is controlled by a control pressure and the closing valve closes the connection of the pressure port with the first user port, if the pressure in the accumulator is below the predetermined pressure. Further, the closing valve can only be closed by the control pressure if the center of the second user component is open. Thus, the fluid source only delivers fluid under high pressure if the second user component is in operation.

15 Claims, 2 Drawing Figures

ACCUMULATOR CHARGING VALVE

BACKGROUND OF THE INVENTION

This invention relates to an accumulator charging valve having a pressure port connected to a source of pressure-transmitting fluid, a first user port connectible with a first user component, a second user port connectible with a pressure accumulator and a second closed-center user component, and a valve device operative in response to the accumulator pressure through which the pressure port is connectible with the second user port via a throttle below a specific accumulator pressure and is connectible with the first user port above a specific accumulator pressure. The valve device includes a non-return valve controllable by a control pressure and adapted to shut off the connection of the pressure port to the first user port below the specific accumulator pressure.

An accumulator charging valve of the aforementioned type is known from German Pat. DE-OS No. 2,364,413. In this accumulator charging valve, with the accumulator loaded, the fluid delivered by the source of pressure-transmitting fluid is completely fed through the open non-return valve to the first user component which may be a power steering gear operating according to the open-center principle.

If the accumulator pressure drops below a predetermined level, the valve device will switch such that the passageway of the non-return valve is at least largely closed and the fluid delivered is supplied to the pressure accumulator until it is again pressurized to its predetermined level. The accumulator pressure will, however, drop not only when the second user component, which may be a brake booster in an automotive vehicle, for example, is added to the circuit, but also as a result of leakage in the individual valves. If the second user component is rarely activated, which is the case, for example, when travelling long distances on a roadway where the brake is rarely applied, the pressure accumulator will become depleted after some time by leakage. In that case, whenever the accumulator pressure drops below a predetermined magnitude, the pump forming the source of pressure-transmitting fluid, which, with the accumulator loaded, delivers fluid to the reservoir at low pressure through the non-return valve and the power steering gear which is usually operated in the open-center mode, is required to recharge the accumulator at a high pressure although there is presently no fluid demand at the second user component, i.e., the brake booster.

However, when fluid is delivered at a high pressure, the pump noise will increase substantially as compared to the delivery of fluid at low pressure. Such noise is very annoying, in particular when the accumulator charging valve is fitted to an automotive vehicle.

SUMMARY OF THE INVENTION

Therefore, it is an object of the present invention to provide an accumulator charging valve of the above-mentioned type in which the development of pump noise is materially reduced.

A feature of the present invention is the provision of an accumulator charging valve comprising a pressure port connected to a source of pressure-transmitting fluid; a first user port connectible to a first user component; a second user port connectible to a pressure accumulator and to a second closed-center user component;

and a valve device operative in response to a pressure in the accumulator to connect the pressure port to the second user port via a throttle below a predetermined accumulator pressure and to connect the pressure port to the first user port when the accumulator pressure is above the predetermined pressure, the valve device includes a non-return valve controllable by a control pressure to shut off the connection between the pressure port and the first user port when the accumulator pressure is below the predetermined pressure, the control pressure being applied to the non-return valve only when the second user component is activated to enable the non-return valve to supply the fluid to the second user component and to charge the accumulator with the fluid.

As a result of this arrangement, loading of the accumulator and, thus a pump delivery at high pressure is possible only if both the accumulator pressure has dropped below a predetermined magnitude and the second user component is activated. This means that fluid is supplied to the second user port only if there is indeed a fluid demand at the second user component. In addition to reducing the noise, the accumulator charging valve constructed according to this inventin also prolongs the life of the pump because the load applied to it is substantially less. The reduced pump load results further in a reduced consumption of driving energy.

In an advantageous embodiment of this invention, the non-return valve may be actuated by the control pressure in the closing direction, and the supply line of the control pressure to the non-return valve may be controllable by a control valve which is closed with the second user component operating in the closed-center mode, with the control valve being preferably a 3-way, 2-position directional control valve having one position connecting the supply line of the control pressure to the non-return valve and the other position connecting an unpressurized return line to the non-return valve. In this arrangement, the control valve may include a closure member having an effective surface which is adapted to be subjected to pressure in the sense of providing a connection of the control-pressure supply line to the non-return valve, and which is connected to a chamber of the second user component subjected to pressure in the open-center mode and relieved of pressure in the closed-center mode. The closure member of the control valve may have bearing on it a spring urging it into the valve position in which the connection of the control-pressure supply line to the non-return valve is shut off, with the spring force being lower than the force of the pressure acting on the effective surface with the second user component operating in the open-center mode.

In another advantageous embodiment of this invention the second user component can be adapted to actuate a pressure-producing unit including a pressure chamber adapted to be pressurized with the second user component operating in the open-center mode, wherein the supply line of the control pressure to the non-return valve is controllable by a control valve operating in response to the pressure in the pressure chamber. By this arrangement the loading of the accumulator and, thus, a pump delivery at high pressure is allowed to take place only if the accumulator pressure has dropped below a predetermined magnitude and if at the same time the second user component is activated, without the function being impaired in the completely depleted state of the accumulator.

The control valve may include a closure member having an effective surface which is adapted to be subjected to pressure in the sense of providing a connection of the supply line of the control pressure to the non-return valve and which is connected to the pressure chamber of the pressure-producing unit. Preferably, the closure member of the control valve may have bearing on it a spring urging it into the valve position in which the connection of the supply line of the control pressure to the non-return valve is shut off, with the spring force being lower than the force of the pressure developing in the pressure chamber and acting on the effective surface.

Besides the control valve which meets the one requirement for a fluid demand at the second user component, a pilot valve may meet the second requirement for the accumulator pressure to have dropped below a predetermined magnitude. Both conditions must be satisfied in order to permit fluid under pressure to be supplied to the second user port. To satisfy this second condition, it will be an advantage if the supply line of the control pressure leads from the connection of the port pressure to the second user port downstream of the throttle to the non-return valve, and if a pilot valve and the control valve are arranged in series in the supply line. In this arrangement, the pilot valve may be an accumulator-pressure-responsive 3-way, 2-position directional control valve by which, above the predetermined accumulator pressure, that part of the supply line that leads from the pilot valve to the non-return valve is connected to an unpressurized return line whereas, below the predetermined accumulator pressure, it is connected to that part of the supply line that leads from the connection to the pilot valve.

In a second embodiment, the pilot valve is an accumulator-pressure-responsive 4-way, 2-position directional control valve by which, above the predetermined accumulator pressure, the supply line leading from the pilot valve to the non-return valve is connected to an unpressurized return line and to a line leading to the second user port, in which line a check valve inhibiting a return flow from the second user component to the pilot valve is arranged, and by which, below the predetermined accumulator pressure, the supply line leading from the pilot valve to the non-return valve is connected to a connection leading from the pressure port via a throttle to the pilot valve and the line. This second embodiment of the pilot valve presents the propagation of high pressures that may develop at the first user port to the pressure accumulator, because fluid is allowed to flow from the pressure port to the pressure accumulator only via the pilot valve.

The second user component may be a brake booster and the pressure-producing unit may be a master cylinder whose pressure chamber is connected to the effective surface of the control valve. The master cylinder may be a tandem master cylinder having a first and a second pressure chamber each associated with a brake circuit, with the pressure chambers being connectible with the effective surface of the control valve through a valve device.

In this arrangement, the pressure chambers are preferably connected to a control line through pressure lines and, through the control line, to the effective surface of the control valve, and the pressure lines each have a check valve arranged therein inhibiting return flow to the pressure chamber. This arrangement has the advantage of the pressure available in the intact brake circuit being in a position to act upon the effective surface of the control valve in the event of a failure of one of the two brake circuits.

Similarly, it serves to ensure the function, in the event of a failure of one of the two brake circuits, if the pressure chambers are each connected through a pressure line to a 3-way, 2-position directional control valve in whose first valve position the first pressure line and in whose second valve position the second pressure line is connected to a control line leading to the effective surface of the control valve, wherein the directional control valve, in the inactive position and with both pressure chambers pressurized, is in its first valve position, while it is in its second valve position when the first pressure chamber is unpressurized and the second pressure chamber is pressurized. Thereby it is ensured that the intact brake circuit is always connected to the effective surface of the control valve. In this arrangement, the 3-way, 2-position directional control valve may be urged into its first valve position by spring load, and the pressure of the first and second pressure chamber may urge it into the second and first valve position, respectively.

In order to ensure a permanent connection of the second pressure circuit to the effective surface in the event of a failure of the brake circuit associated with the first pressure chamber, the 3-way, 2-position directional control valve may be locked in its second valve position with the first pressure chamber unpressurized and the second pressure chamber pressurized.

The tandem master cylinder may be a stepped tandem master cylinder, wherein the first pressure chamber is formed in the smaller step, and the second pressure chamber is formed in the larger step.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
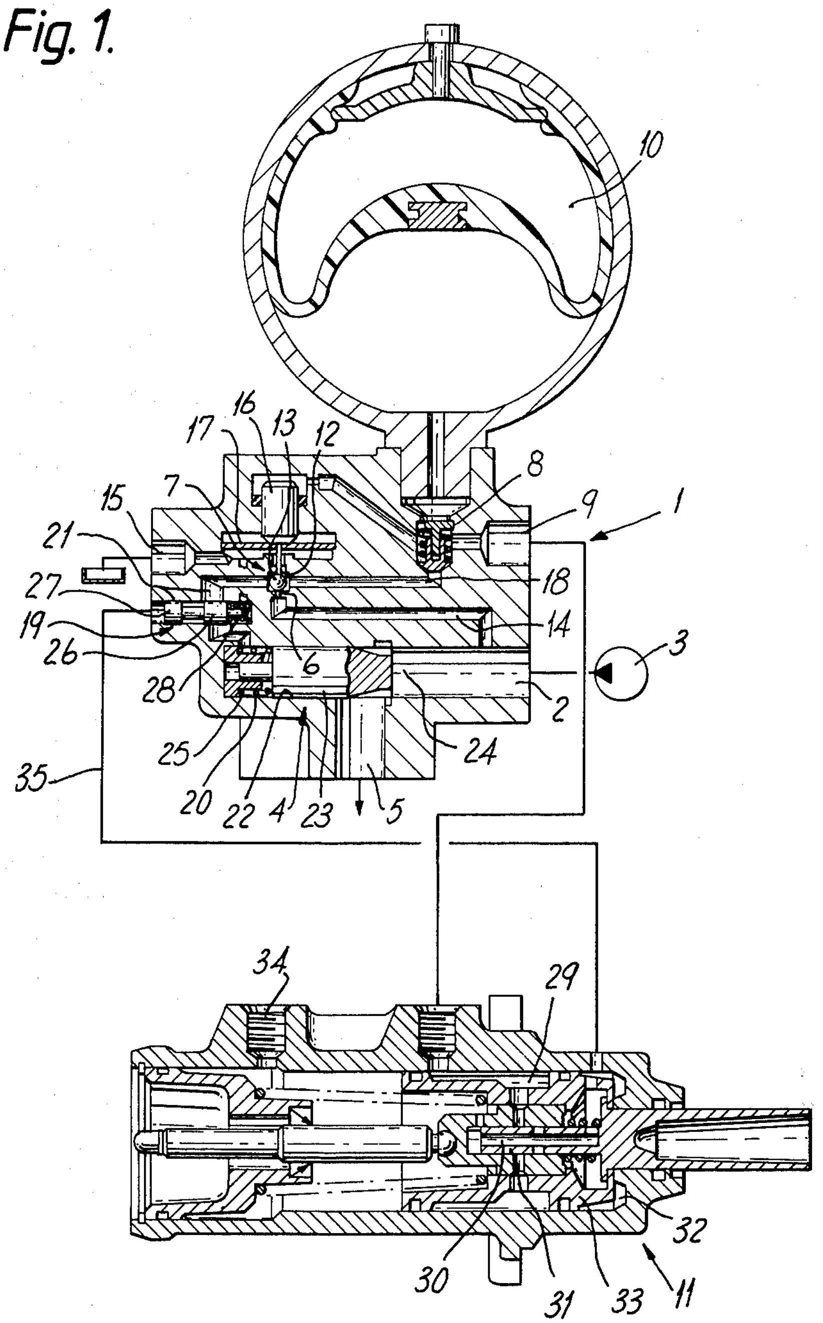
FIG. 1 is a longitudinal cross sectional view of a first embodiment of an accumulator charging valve constructed in accordance with the principles of the present invention.
Figure 2:
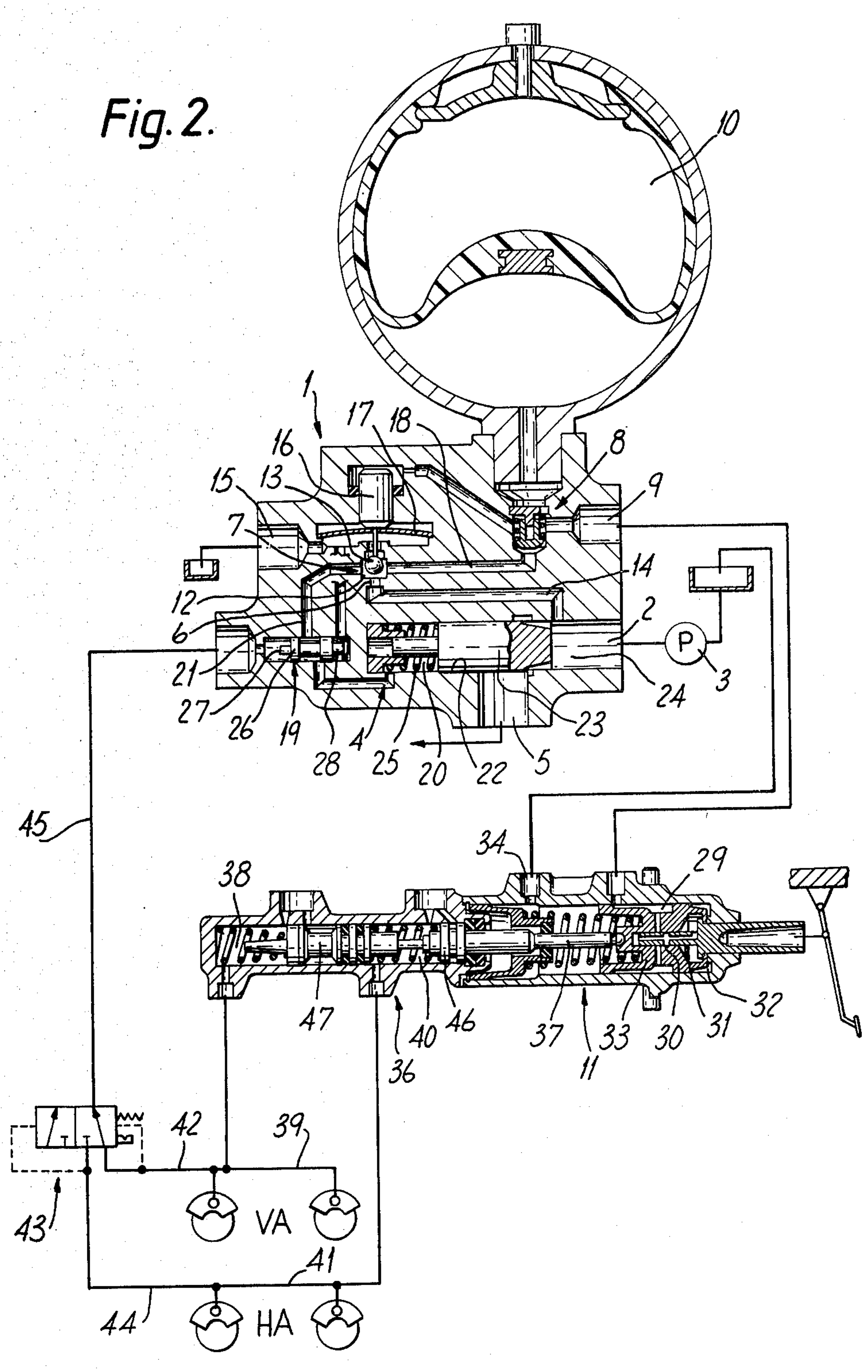
FIG. 2 is a longitudinal cross sectional view of a second embodiment of an accumulator charging valve constructed in accordance with the principles of the present invention.

The accumulator charging valve 1 shown in FIGS. 1 and 2 includes a pressure port 2 to which a pump 3 is connected with its delivery line. Via a non-return valve 4, pressure port 2 is connectible with a first user port 5 to which a power steering gear, operating in the open-center mode, of an automotive vehicle may be connected.

Via a throttle 6 and a pilot valve 7 as well as a check valve 8, pressure port 2 is also connectible with a second user port 9. Connected to the second user port 9 is both a hydro-pneumatic pressure accumulator 10 and a hydraulic brake booster 11.

The pilot valve 7 includes a chamber 12 accommodating a ball 13 serving as a valve-closure member. Opening into chamber 12 on opposite sides is a connection 14 between the pressure port 2 and the pilot valve 7 and a line leading to an unpressurized return line 15, with the orifices of the connection 14 and of the line leading to the return line 15 forming valve seats at chamber 12 for seating engagement with the valve-closure member (ball 13). Which of these two fluid-pressure channels is shut off by ball 13 is dependent upon the pressure in the accumulator 10.

Above a predetermined accumulator pressure, ball 13 will be displaced into the position shutting off the connection 14 by an operating piston 16 subjected to accumulator pressure against the force of a spring 17, whereas below a predetermined accumulator pressure spring 17 will displace the operating piston 16 into the opposite direction so that ball 13 shuts off the connection of chamber 12 to return line 15.

Further opening into chamber 12 on opposite sides is a line 18 leading from chamber 12 via check valve 8 to the second user port 9, and a supply line 21 leading from chamber 12 via a control valve 19 to a pressure chamber 20 of non-return valve 4. Thus, supply line 21 and line 18 are connected with pressure port 2 or with the unpressurized return line 15, depending on the position of pilot valve 7 and, consequently, depending upon the pressure level in accumulator 10.

The non-return-valve 4 comprises a piston 23 which is axially slidable in a cylindrical bore 22 and divides the cylindrical bore 22 into pressure chamber 20 and a chamber 24 connected to pressure port 2, so that the end surface of piston 23 pointing towards pressure chamber 20 may be subjected to a control pressure while its end surface pointing towards chamber 24 is subjected to the discharge pressure of the pump 3. Piston 23 at least largely shuts off the first user port 5 opening radially into the cylindrical bore 22, with piston 23 being adapted to be subjected to the discharge pressure of pump 3 in the opening direction and, in addition to the control pressure, to the force of a spring 25 in the closing direction.

The control pressure is a pressure which is reduced compared to the pump discharge pressure by throttle 6 and is allowed to be supplied from chamber 12 of pilot valve 7 to pressure chamber 20 through supply line 21 only with the pilot valve 7 open and the control valve 19 in the appropriate position.

Control valve 19, whose closure member 26 is a valve spool, connects in the one valve position the pressure chamber 20 of the non-return valve 4 with the unpressurized return line 15 and, in the other valve position, with the chamber 12 of pilot valve 7 via supply line 21. Closure member 26 includes an effective surface 27 which may be subjected to pressure against the force of a spring 28.

The brake booster 11 which forms the second user component includes an inlet chamber 29 which is closed with the brake in the inactivated state. When the brake is applied, the inlet chamber 29 is connected to a piston chamber 32 via a valve spool 31 having a passage bore 30, and a piston 33 acting as a brake booster is pressurized. With the passage bore 30 shut off, piston chamber 32 is connected to an unpressurized return line 34.

From piston chamber 32 in FIG. 1, a channel 35 leads to effective surface 27 of closure member 26 of control valve 19, so that with the brake applied and piston chamber 32 pressurized, effective surface 27 is subjected to pressure whereby control valve 19 opens the connection of supply line 21 to the pressure chamber 20 of the non-return valve 19. With the brake not applied, piston chamber 32 is unpressurized as a result of which effective surface 27 is not subjected to pressure. In that case, spring 28 shifts closure member 26 into the position in which pressure chamber 20 is connected to the unpressurized return line 15. If the accumulator pressure drops below a predetermined magnitude without the brake being applied, pressure chamber 20 of non-return valve 4 remains unpressurized. Piston 23, which has bearing on it in the closing direction only the spring 25, while in the opening direction it is subjected to the discharge pressure of pump 3 and, thus, remains in the open position so that the fluid supplied flows from pressure port 2 to the first user port 5.

Piston 23 of non-return valve 4 will assume the same position if the accumulator pressure exceeds a predetermined magnitude.

However, if the accumulator pressure is below a predetermined magnitude so that chamber 12 of pilot valve 7 is connected to pressure port 2 through connection 14 and throttle 6, and if in addition the brake is applied, pressure will act on effective surface 27 of closure member 26 of control valve 19 from the pressurized piston chamber 32 of brake booster 11, causing the control valve to assume a position in which pressure chamber 20 of non-return valve 4 is connected to chamber 12 of pilot valve 7 through supply line 21. This enables the pressure prevailing in chamber 12, which pressure serves as control pressure, to act upon piston 23 in pressure chamber 20 and displace it in the closing direction together with spring 25. Thereby, the first user port 5 is at least largely isolated from pressure port 2, and the fluid discharged is supplied to the second user port 9 as well as to pressure accumulator 10 through connection 14, throttle 6, pilot valve 7 and check valve 8, thus loading the accumulator.

Thus, when the accumulator pressure has dropped below a predetermined magnitude, for example as a result of leakage in the individual valves, it will be loaded only if there is in fact a fluid demand at the brake booster. Such depletion of the pressure accumulator may occur, for example, when driving a long distance on the roadway without applying the brake.

Fitted to brake booster 11 in FIG. 2 is a tandem master cylinder 36 which forms a pressure-producing unit and is actuatable by the push rod 37 of brake booster 11.

Tandem master cylinder 36 includes a first pressure chamber 38 associated with a front-axle brake circuit 39, and a second pressure chamber 40 associated with a rear-axle brake circuit 41.

Through a first pressure line 42, the front-axle brake circuit 39 and, thus, the first pressure chamber 38 are connected to a 3-way, 2-position directional control valve 43, while the rear-axle brake circuit 41 and, thus, the second pressure chamber 40 are connected to valve 43 through a second pressure line 44. In the first and second valve position, the first and second pressure line 42 and 44, respectively, is connected to a control line 45 leading to effective surface 27 of control valve 19. In its first valve position, the 3-way, 2-position directional control valve 43 is spring-loaded and urged into the second valve position by the pressure of the first pressure chamber 38 and into the first valve position by the pressure of the second pressure chamber 40. In addition, the 3-way, 2-position directional control valve 43 can be locked in its second valve position.

When the brake is applied, the push rod 37 of brake booster 11 acts upon push-rod piston 46 of tandem master cylinder 36 and, through the pressure fluid contained in the second pressure chamber 40, upon piston 47 so that pressure develops in both pressure chambers 38 and 40. Through pressure line 42 and 3-way, 2-position directional control valve 43, the pressure in pressure chamber 38 acts on effective surface 27 of the closure member 26 of control valve 19 so that with the brake applied control valve 19 opens the connection of supply line 21 to pressure chamber 20 of non-return valve 4.

Should the front-axle brake circuit 39 be defective so that pressure does not build up in pressure chamber 38 during braking, the second pressure chamber 40 will nevertheless be pressurized. Because the 3-way, 2-position directional control valve 43 is only loaded into the direction of the second valve position, it will switch to that second valve position against the spring load and become locked there. Then the pressure prevailing in second pressure chamber 40 is allowed to act upon effective surface 27 of control valve 19 through pressure line 44 and 3-way, 2-position directional control valve 43 and control line 45 and thus switch valve 19.

With the brake not applied, effective surface 27 is not pressurized. In that case, spring 28 shifts closure member 26 into the position in which pressure chamber 20 is connected to the unpressurized return line 15. If the accumulator pressure drops below a predetermined magnitude without the brake being applied, pressure chamber 20 of non-return valve 4 remains unpressurized. Piston 23, which has bearing on it in the closing direction only the spring 25, while in the opening direction it is subjected to the discharge pressure of pump 3, remains in the open position so that the fluid supplied flows from pressure port 2 to the first user port 5. Piston 23 of non-return valve 4 will assume the same position if the accumulator pressure exceeds a predetermined magnitude.

However, if the accumulator pressure is below a predetermined magnitude so that chamber 12 of pilot valve 7 is connected to pressure port 2 through connection 14 and throttle 6, and if in addition the brake is applied, pressure from one of the pressure chambers 38 or 40 will act on effective surface 27 of closure member 26 of control valve 19, causing it to assume the position in which pressure chamber 20 of non-return valve 4 is connected to chamber 12 of pilot valve 7 through supply line 21. This enables the pressure prevailing in chamber 12, which pressure serves as control pressure, to act upon piston 23 in pressure chamber 20 and displace it in the closing direction together with spring 25. Thereby the first user port 5 is at least largely isolated from pressure port 2, and the fluid discharged is supplied to the second user port 9 as well as to pressure accumulator 10 through connection 14, throttle 6, pilot valve 7 and check valve 8, thus loading the accumulator 10.

Thus, when the accumulator pressure has dropped below a predetermined magnitude, for example as a result of leakage in the individual valves, it will be loaded only if there is in fact a fluid demand at the brake booster. Such depletion of the pressure accumulator may occur, for example, when driving a long distance on the roadway without applying the brake.

The present invention avoids pump 3 being required to operate at high pressure and load accumulator 10 although there is no fluid demand at brake booster 11. The magnitude of the pressure delivered through non-return valve 4 to the power steering gear mostly operating in the open-center mode is substantially lower than the pressure required for loading accumulator 10.

Because the discharge of fluid under high pressure causes substantially higher noise than the discharge of fluid under low pressure, and because the accumulator charging valve constructed according to this invention substantially reduces the discharge of fluid under high pressure, the noise which is particularly annoying in automotive vehicles is materially reduced, too.

While I have described above the principles of my invention in connection with specific apparatus it is to be clearly understood that this description is made only by way of example and not as a limitation to the scope of my invention as set forth in the objects thereof and in the accompanying claims.

I claim:

1. An accumulator charging valve comprising:

a pressure port connected to a source of pressure-transmitting fluid;

a first user port connectible to a first user component;

a second user port connectible to a pressure accumulator and to a second closed-center user component;

a valve device operative in response to pressure in said accumulator to connect said pressure port to said second user port via a throttle below a predetermined accumulator pressure; and to disconnect said pressure port from said second user port when said accumulator pressure is above said predetermined pressure; and a non-return valve having an open position to connect said pressure port to said first user port and a closed position to shut off the connection between said pressure port and said first user port, said non-return valve moving from said closed position to said open position when said valve device disconnects said pressure port from said second user port responsive to increase of accumulator pressure above said predetermined pressure, and said non-return valve being moved from said open position to said closed position by a control pressure when said accumulator pressure falls below said predetermined pressure to thereby move said valve device to said connecting position and said second user component is concurrently activated to enable said non-return valve to supply said fluid to said second user component and to charge said accumulator with said fluid, said control pressure being coupled to said non-return valve by a supply line containing therein a control valve having a first position connecting said supply line to said non-return valve when said second user component is activated and a second position connecting an unpressurized return line to said non-return valve when said second user component is inoperative.

2. A charging valve according to claim 1 wherein said control valve includes a closure member having an effective surface which then subjected to pressure places said control valve in said first position, said effective surface being connected to at least one chamber of said second user component which is pressurized when said second user component is activated and which is unpressurized when said second user component is inactive.

3. A charging valve according to claim 2, wherein said closure member is urged into said second position by a spring bearing against a surface of said closure member spaced from said effective surface, said spring having a force lower than the force of said pressure acting on said effective surface when said second user component is activated.

4. A charging valve according to claim 1 wherein said second user component actuates a pressure-producing unit including at least one pressure chamber which is pressurized when said second user component is activated, and said control valve operates in response to pressure in said pressure chamber.

5. A charging valve accordingg to claim 4, wherein said control valve includes a closure member having an effective surface which when subjected to pressure places said control valve in a position to connect said supply line to said non-return valve, said effective surface being connected to said pressure chamber.

6. A charging valve according to claim 5, wherein said closure member is urged into a position to disconnect said supply line from said non-return valve by a spring bearing against a surface of said closure member spaced from said effective surface, said spring having a force lower than the force of said pressure developed in said pressure chamber acting on said effective surface.

7. A charging valve according to claim 5 or 6, wherein said second user component is a brake booster, and said pressure-producing unit is a master cylinder having a master cylinder pressure chamber as said pressure chamber connected to said effective surface.

8. A charging valve according to claim 5 or 6, wherein said second user component is a brake booster, and said pressure-producing unit is a tandem master cylinder having first and second pressure chambers each coupled to a different one of a pair of brake circuits, said first and second pressure chambers being connectible to said effective surface through a valve means.

9. A charging valve according to claim 8, wherein said first and second chambers are connectible to a control line through a different one of two pressure lines, said control line being connected to said effective surface and said two pressure lines each have disposed therein a check valve to inhibit return flow to said first and second chambers.

10. A charging valve according to claim 8, wherein said first and second chambers are connected through first and second pressure lines, respectively, to said valve means in the form of a 3-way, 2-position directional control valve having a first position to connect said first pressure line to a control line and a second position to connect said second pressure line to said control line, said control line being connected to said effective surface, said directional control valve being in said first position when it is inactivated and both of said first and second chambers are pressurized and in said second position when said first chamber is unpressurized and said second chamber is pressurized.

11. A charging valve according to claim 10, wherein said directional control valve is urged into said first position by a spring, and the pressure of said first and second chambers urge said directional control valve into said second position and first position, respectively.

12. A charging valve according to claim 4, wherein said second user component is a brake booster, and said pressure-producing unit is a master cylinder having a master cylinder pressure chamber as said pressure chamber.

13. A charging valve according to claim 1, further including a connection from said pressure port to said second user port including said throttle, and wherein said supply line is connected between said connection downstream of said throttle and said non-return valve, and a pilot valve and said control valve are disposed in series in said supply line.

14. A charging valve according to claim 13, wherein said pilot valve is an accumulator-pressure-responsive 3-way, 2-position directional control valve operative above a predetermined accumulator pressure to connect that part of said supply line leading from said pilot valve to said non-return valve to an unpressurized return line and operative below said predetermined accumulator pressure to connect that part of said supply that leads from said connection to said pilot valve.

15. A charging valve according to claim 13, wherein said pilot valve is an accumulator-pressure-responsive 4-way, 2-position directional control valve operative above a predetermined accumulator pressure to connect that part of said supply line leading from said pilot valve to said non-return valve to an unpressurized return line and to a line leading to said second user port, said line having disposed therein a check valve inhibiting a return flow from said second user component to said pilot valve, and said directional control valve is operative below said predetermined accumulator pressure to connect that part of said supply line leading from said pilot to said non-return valve to a connection leading from said pressure port via said throttle to said pilot valve and said line.

* * * * *